Sept. 25, 1945.  N. H. TRITT  2,385,742
LANDING GEAR FOR AIRCRAFT
Filed May 8, 1944  2 Sheets-Sheet 1

INVENTOR.
Norman H. Tritt
BY
Victor J. Evans & Co.
ATTORNEYS

Sept. 25, 1945.                N. H. TRITT                2,385,742
                        LANDING GEAR FOR AIRCRAFT
                        Filed May 8, 1944          2 Sheets-Sheet 2
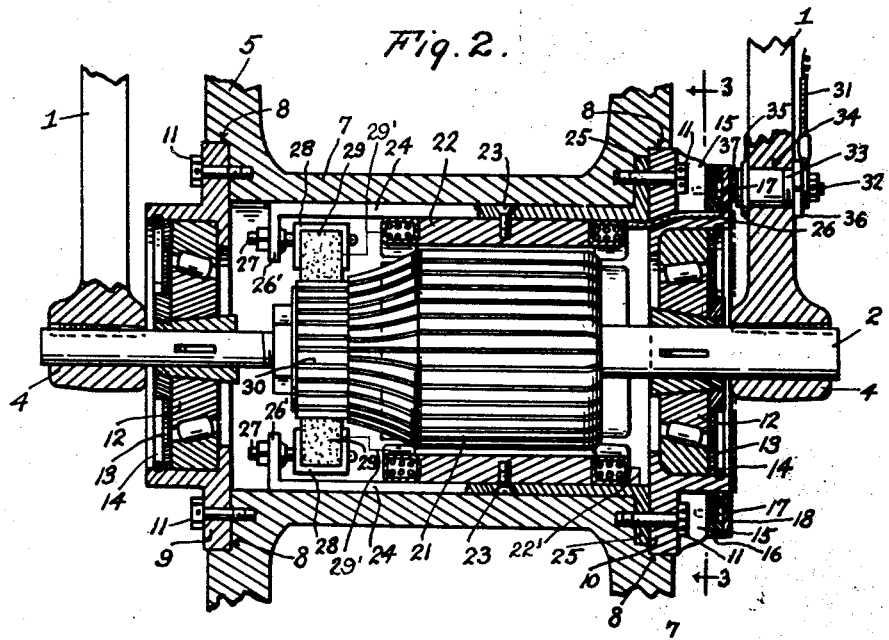
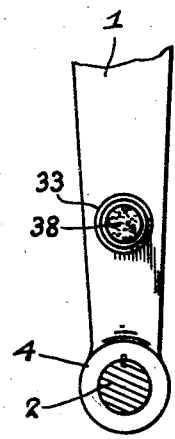
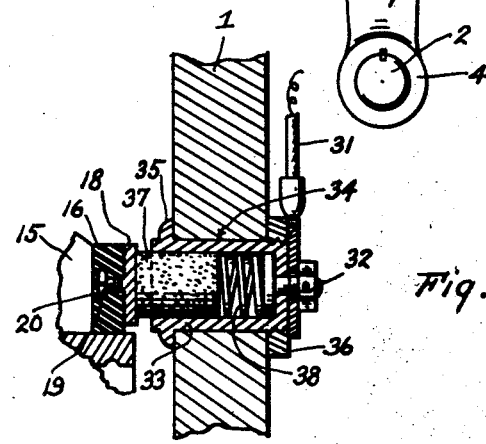
INVENTOR.
Norman H. Tritt
BY
Victor J. Evans & Co.
ATTORNEYS Patented Sept. 25, 1945

2,385,742

UNITED STATES PATENT OFFICE 2,385,742

LANDING GEAR FOR AIRCRAFT

Norman H. Tritt, Akron, Ohio

Application May 8, 1944, Serial No. 534,602

5 Claims. (Cl. 172—287)

Airplanes as now built have landing wheels which are rotatably mounted but rotation of wheels is started by contact of the wheels with the runway or ground upon which the airplane lands. This causes the landing gear to have a tendency to retard forward movement of the airplane and when a heavy, high speed plane is being landed retarding of its forward movement is liable to cause it to nose over and damage the airplane and probably cause injury to occupants of the airplane.

Therefore one object of the invention is to provide an airplane with landing wheels having means associated with them for imparting rotation to the wheels and thus permit the wheels to be rotated prior to making a landing. It will thus be seen that the wheels will be in motion when a landing is made and checking of its forward movement will be eliminated.

Another object of the invention is to provide landing wheels which are driven by electric motors built in hubs of the wheels and each having its armature fixed to the axle about which the wheel turns.

Another object of the invention is to so form and arrange elements of the motor that a contact for supplying current to the motor may be carried by a fork or arm of the wheel mounting and have contact with a slip ring at one end of the field of the motor.

Another object of the invention is to provide an airplane wheel with a motor which is housed within the wheel hub where it will be protected from dust and dirt and also prevented from being damaged by stones or the like thrown up from a landing field when an airplane is landed.

The invention is illustrated in the accompanying drawings wherein:

Figure 2 is a sectional view taken vertically through the landing wheel along line 2—2 of Figure 1.

Figure 5 is a view looking at the inner face of a fork or arm of the landing gear.

Figure 6 is a view looking at the outer face of the landing gear arm or fork.

Figure 7 is a sectional view taken along line 7—7 of Figure 6.

Figure 1:
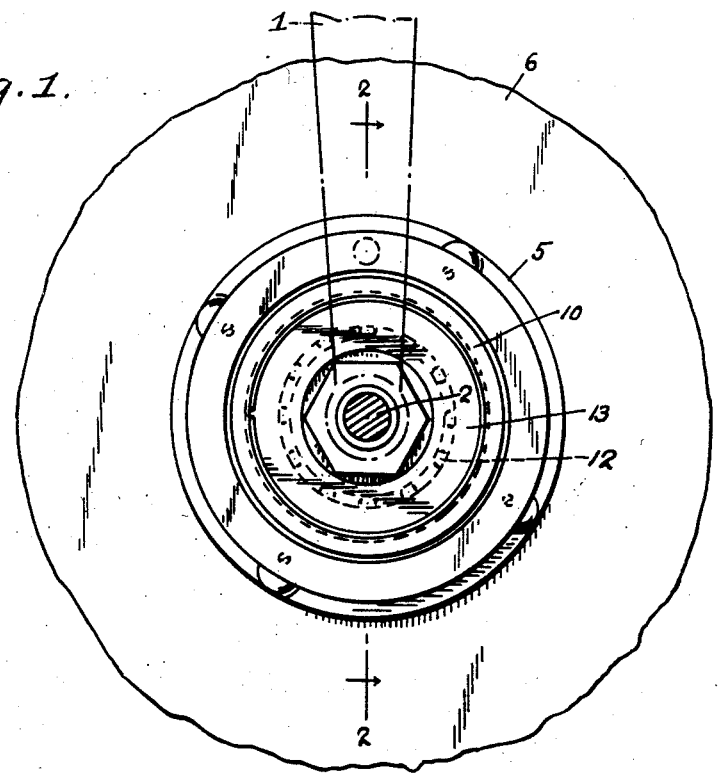
Figure 1 is a view showing the improved landing wheel in side elevation and its axle in section.
Figure 3:
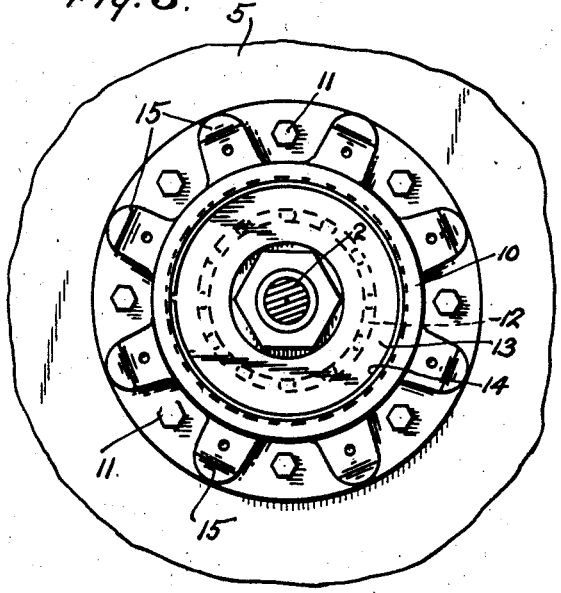
Figure 3 is a view taken along line 3—3 of Figure 2.
Figure 4:
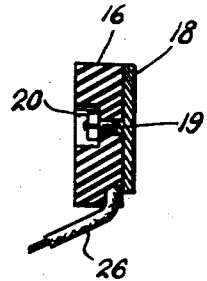
Figure 4 is a fragmentary sectional view taken through the insulating ring and the contact ring of the motor for the landing wheel.

The landing gear of the airplane equipped with the improved wheels is of conventional construction and includes forks or arms 1 for carrying each wheel. These arms or forks carry an axle 2 so that a wheel 5 may be rotatably mounted, the axle being held against rotation in the terminals 4 of the arms 1. The wheel 5 carries a tire 6 and has a hub 7 which is of sufficient diameter to fit about a motor and constitute a casing for the motor. Ends of the hub are recessed to form seats 8 in which fit bearing housings 9 and 10 and these bearing housings are secured by screws 11 and carry bearings 12 which are covered by dust rings 13 and held in place by resilient split wire retainer rings 14. It will thus be seen that the wheel may turn freely about its axle.

The bearing housing 10 is formed with outstanding lugs 15 against which fits an insulating ring 16 which is secured by screws 17. A slip ring 18 formed of conductive metal is disposed against the outer face of the insulating ring where it is secured by fasteners 19 having nuts at their ends countersunk in pockets 20 so that they will not make contact with the bearing housing and cause a short circuit when current is fed to the motor within the hub.

This motor has an armature 21 which is fixed to the stationary axle 2 and the field magnet or poles 22 which surrounds the armature and is secured by screws 23 to metal bars 24. These bars are the usual stator bars of an electric motor, but since the armature is fixed to the stationary axle and the bars are secured to the hub by the screws 11 which pass through arms 25 formed by bending outer end portions of the bars, these bars and the field constitute the rotor of the motor and cause the wheel to be turned when current is supplied to the motor. The lead wire 26 passes outwardly from the field through the bearing housing 10 and its outer end is soldered or otherwise firmly secured to the slip ring. Inner end portions of the bars 24 are bent to form ears 26' perforated to receive the stems 27 of carriers 28 in which are mounted carbon brushes 29 which bear against the end portion 30 of the armature 2. Conductor wires 29' connect the brush carriers 28 to the field magnet or poles 22 and the magnet or poles 22 are in turn grounded by the conductor wire 22' so that when current is fed to the motor the wheel will be caused to turn.

The current is delivered from a battery or other source through the conductor wire 31 which extends along one arm of fork 1 of the landing gear and has its lower end secured to the terminal bolt 32 of a brush holder 33 carried by this fork. The brush holder consists of a cup which is passed through an opening 34 in the fork and has a flange 35 about its open inner end and its outer end threaded to receive a nut 36 by which the cup is firmly held in place. A carbon brush 37 is slidably mounted in the cup and urged outwardly by a spring 38 so that it has conductive contact with the slip ring 18 and current may be fed to the motor during rotation of the wheel. The other side of the line is grounded.

When an aircraft equipped with the improved landing wheels is in flight and a landing is to be made the circuit for the wheel motors is closed and current will thus be delivered to the motors and the wheels turned about their axles. It will thus be seen that the wheels will be turning when a landing is made, instead of being turned by frictional contact with the ground or runway of a landing field, and forward movement of the aircraft will not be checked. After a landing has been made the current will be shut off and the wheels will turn by engagement with the ground until the aircraft is brought to a stop.

Having thus described the invention, what is claimed is:

1. In a landing gear for aircraft, forks, a stationary axle carried by and extending between said forks, a wheel having a hollow hub through which said axle passes axially thereof, having cups at ends of said hub mounting the wheel for turning about the axle, an insulating ring carried by one bearing cup, a slip ring mounted against said insulating ring, a brush holder carried by the adjoining fork, a brush in said holder urging towards said slip ring for conductive engagement therewith, an armature fixedly mounted about said axle, a field magnet about said armature, bars carrying said field magnet extending longitudinally in said hub and having outer end portions formed with side arms secured to the hub, there being also arms at inner ends of the bars, brush holders carried by the inner arms and provided with brushes making contact with the armature, and a lead wire for the field extending out of the hub and attached to the slip ring.

2. In a landing gear for aircraft, forks, a stationary axle carried by and extending between said forks, a wheel having a hollow hub through which said axle passes axially thereof, bearing cups at ends of said hub mounting the wheel for turning about the axle, lugs carried by one bearing cup, an insulating ring secured against said lugs, a slip ring disposed against the insulating ring and provided with fasteners passing through the insulating ring and countersunk with respect to the inner side face of said insulating ring, a brush holder carried by the adjoining fork and carrying a brush urged into engagement with the slip ring, and a motor in the hub including an armature mounted about the axle in fixed relation thereto and a field carried by the hub and provided with a feed wire passing through the last mentioned bearing cup and secured to the slip ring.

3. In a landing gear for aircraft, forks, a stationary axle carried by and extending between said forks, a wheel having a hollow hub through which said axle passes axially thereof, bearing cups at ends of said hub mounting the wheel for turning about the axle, an insulating ring carried by one bearing cup, a slip ring mounted against said insulating ring, an armature within said hub disposed about the axle and fixedly secured thereto, bars extending longitudinally in said hub and secured to the hub, a field magnet disposed about said armature and secured to said bars, brushes carried by said bars and bearing against the armature, a conductor wire extending from said field magnet and secured to the slip ring, and a brush carried by the adjoining fork and bearing against the outer side face of the slip ring.

4. In a landing gear for aircraft, forks, a stationary axle carried by said forks, a wheel having a hollow hub disposed about said axle, bearings between said axle and ends of said hub, a slip ring carried by one bearing in spaced relation thereto, an armature within said hub disposed about the axle and fixedly secured thereto, bars extending longitudinally in said hub and having outstanding arms at their outer ends secured to said hub and inwardly projecting side arms at their inner ends, brush holders having stems mounted through the inner side arms of said bars, brushes carried by said holders and engaging the armature, a field magnet about said armature secured to said bars, a lead wire extending from said field magnet and secured to said slip ring, and a brush holder carried by the fork adjoining the slip ring and provided with a brush engaging the slip ring.

5. In a landing gear for aircraft, forks, a stationary axle carried by said forks, a wheel having a hollow hub disposed about said axle, bearings between said axle and ends of said hub, a slip ring carried by one bearing in spaced relation thereto, an armature within said hub disposed about the axle and fixedly secured thereto, a field magnet about said armature fixed to said hub and having a lead wire secured to the slip ring, a brush holding cup mounted through an opening in the fork adjoining the slip ring and open at its inner end, an abutment flange about the open end of said cup bearing against the fork, a securing nut threaded upon the closed outer end of the cup, a terminal bolt mounted through the closed outer end of the cup and having a nut at its outer end for securing a power wire to the bolt, a brush in said cup, and a spring in the cup engaging the inner end of the brush and urging the brush outwardly for engagement with the slip ring.

NORMAN H. TRITT.